April 30, 1940.   M. W. SAFHOLM   2,199,115
SPARK PLUG TESTER
Filed Dec. 24, 1938
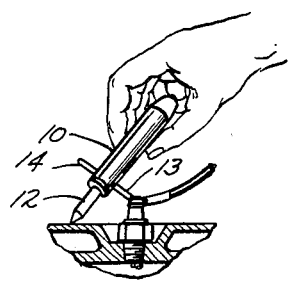
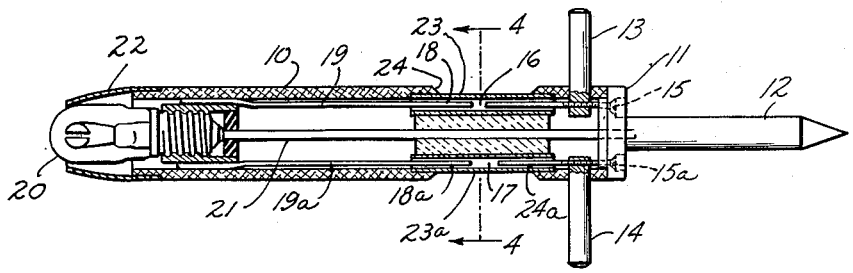
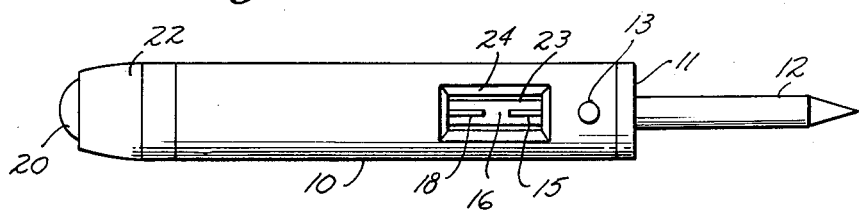
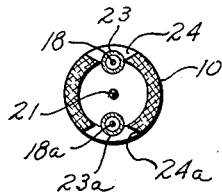
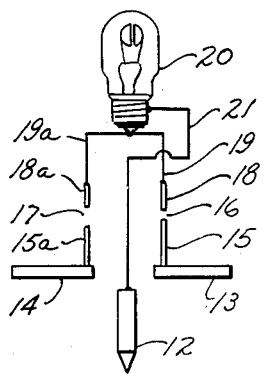
INVENTOR.
Mandell W. Safholm,
BY
ATTORNEY.

Patented Apr. 30, 1940

2,199,115

UNITED STATES PATENT OFFICE 2,199,115

SPARK PLUG TESTER

Mandell W. Safholm, Glendale, Calif.

Application December 24, 1938, Serial No. 247,590

7 Claims. (Cl. 175—183)

My invention relates in general to apparatus for testing spark plugs, and more particularly to a pocket-size device capable of checking the gap setting of spark plugs.

It is an object of my invention to provide a device for checking the gap setting of a spark plug while the latter is installed in an internal combustion engine, and while the engine is running.

It is also an object of my invention to provide a device which will accurately check the gap setting of the spark plugs of all makes and models of automobiles, irrespective of the condition of the cylinder or the plug.

It is a further object of my invention to provide a device which is simple and easy to use, and one which requires no adjustments during its operation.

It is still another object of my invention to provide a device which is small in size, accurate in calibration, and positive in indication.

These and other objects of my invention will become apparent from the following description of a preferred form thereof, and from the accompanying drawing illustrating that form, in which:

Fig. 1 is a perspective utility view,

Fig. 2 is a side view of the device,

Fig. 3 is a longitudinal cross-section of the device, showing its internal construction, Fig. 4 is a cross-sectional view taken at 4—4 in Fig. 3, and Fig. 5 is a schematic wiring diagram of the device.

Referring now to the drawing, and particularly to Fig. 3 thereof, the numeral 10 indicates a housing which is preferably cylindrical in shape. The housing 10 is made of some suitable insulating material, such as "Bakelite," or the like, and may be partially closed at one end by an annular plate 11 of similar material. Extending outwardly through the center of the plate 11 is a grounding point 12 which I prefer to make entirely of metal, although if desired, the shank may be covered with an insulating material, leaving only the tip exposed. Near that end of the housing 10 which is closed by the annular plate 11, I have shown two radially-extending metal contact rods 13 and 14 retained by suitable means, such as screws 15 and 15a respectively, which are parallel to the axis of the housing and have their heads countersunk into the annular plate 11. The contact rods 13 and 14 have associated with them spark gaps 16 and 17 respectively; and in the preferred form shown, the screw 15 holding the contact rod 13 passes on through the rod to form one of the electrodes of the spark gap 16. A second electrode 18 of the gap 16 is connected by means of a conductor 19 to one of the terminals of an indicator lamp 20, and by a similar arrangement, the corresponding electrode 18a of the gap 17 is connected to the same terminal of the lamp by a conductor 19a.

The indicator lamp 20 is preferably located in the end of housing 10 opposite from the grounding point 12, and I have found a very suitable lamp for this purpose to be one of the small so-called "neon glow-lamps" now on the market. A conductor 21 connects the other terminal of the lamp 20 with the grounding point 12, thus completing the circuit of the tester. A removable guard 22 protects the lamp 20 from breakage, and may be removed should it be desired to replace the lamp.

While I have shown the gaps 16 and 17 protected by the glass envelopes 23 and 23a respectively, and visible from outside the housing 10, it will be understood that the gaps may be completely enclosed within the housing and hidden from view. In either case, however, I prefer to provide each of the contact rods 13 and 14 with some distinctive indicia so that the person making the test may readily know which of the gaps 16 and 17 he is using. This indicia may take the form of color, such as paint, etc., placed on the contact rod, or the contact rods may be given a distinctive cross-sectional form, e. g., one may be square, another circular, a third triangular, etc.

The spacing of the gaps 16 and 17 is determined by checking against spark plugs of known characteristics as hereinafter described, adjustment being made by suitable means, such as the screws 15 and 15a; and when once properly adjusted, the means are sealed, as for example, by filling the counter-sunk holes in the annular plate 11 with sealing wax.

To test the gap setting of a spark plug in a motor, the engine is run until it has reached its normal operating temperature, and the throttle is adjusted to idle position. The grounding point 12 is then touched to the cylinder-block of the engine, taking care to see that good electrical contact is made, and the contact rod 13 is then placed against the upper spark plug terminal, as shown in Fig. 1. If the plug is set properly, the indicator lamp 20 will not glow when the engine is idling; but if the throttle is suddenly opened, the lamp will glow three or four times while the engine is accelerating. If the lamp 20 does not glow either when the engine is idling or when it is suddenly accelerated, this indicates that the spark plug gap is too narrow. On the other hand, if the lamp glows continually, it indicates that the spark plug gap is probably too wide; however, in the last case, it does not necessarily follow that the gap is excessively wide. To determine whether or not the gap setting is excessively wide, the contact rod 14 is placed against the spark plug connection and the test repeated. If the lamp 20 now fails to glow, it indicates that the gap is not so wide as to cause a serious loss of efficiency in the motor; but, if the lamp glows continually, it indicates that the gap is so wide as to cause noticeable loss of power. While I have shown a form of my invention having two gaps with their associated contact rods, it may, in some instances, be desirable to add more gaps in order that the operator may have a better idea as to the degree of variation from the proper setting.

If the plug being tested does not cause the indicator lamp to light under any of the above-mentioned conditions, in some circumstances the operator may doubt that current is being supplied to the spark plug; and to check this, the grounding point 12 is touched to the center terminal of the plug, and the contact rods 13 and 14 are left unconnected. If the lamp 20 glows under these circumstances, electricity is being supplied to the plug, whether or not the plug is "firing" properly.

To insure proper combustion of the fuel in the cylinder of any automobile, it appears that the resistance of the spark plug gap must be between certain limits; and while the resistance is usually at the proper value when the car leaves the factory, it can be varied by a number of various factors. For example, as the engine is run, carbon is formed within the combustion chamber, thus raising the pressure in the cylinder and hence the resistance of the plug gap, since the resistance of the latter increases as the pressure and/or the gap width increase. More usually, however, the engine will lose compression through leaky valves or worn piston rings, thus lowering the resistance of the plug gap. As a result of continued use of the engine, there is usually a certain amount of burning or corroding away of the points of the spark plug gap, and this widening of the gap causes an increase in its resistance. Since it is probable that no two cylinders of an engine will have the same conditions existing within them, the need for a proper setting for each individual cylinder is readily seen. By the proper use of my device, the functioning of which I believe depends upon the plug gap resistance, each spark plug may be correctly adjusted for the particular conditions found in its own cylinder; and the engine may then deliver the maximum power possible under existing conditions of wear, etc.

While the above-described embodiment of my invention is the preferred form thereof, I have found that it is possible to construct a simpler instrument capable of making a portion of the tests previously described. Although this simpler instrument is cheaper to manufacture, it is not so convenient to use, and unless price is a dominant factor, I prefer to use the form of my invention previously described. In the less expensive instrument, I omit the indicator lamp 20 and connect the conductors 19 and 19a directly to the conductor 21, thus using the discharge in the gap 16 or 17 to indicate the condition of the spark plug being tested. In such a modified instrument, the gaps 16 and 17 are provided with the transparent envelopes 23 and 23a, and may be disposed behind apertures 24 and 24a as previously described; but I prefer to locate the gaps where they will be more readily visible, as for example, at or near the end opposite from the grounding point 12. While this simplified form of instrument will check the gap setting of spark plugs as accurately as will my preferred form, the discharge in the gap 16 or 17 is not so bright or so readily seen as the lighting of the indicator lamp 20. In addition, the simpler form of instrument does not have provision for determining whether or not the spark plug is receiving electricity, as may be done with the preferred form of my invention by placing the grounding point against the center terminal. However, even though the simpler form of my invention does not possess all of the advantages of my preferred form, it nevertheless is a distinct advance over the prior art, and is a definite aid in the adjusting of internal combustion engines to peak performance.

From the foregoing, it will be seen that I have provided a small, sturdy, pocket-sized device which will quickly and accurately check the gap setting of spark plugs without removing them from the engine, and when the expression "pocket-sized" appears in the specification and claims, it is to be understood to mean of a size such that it may be placed in the vest pocket of the usual style suit. My device is simple to use and economical to manufacture, and will quickly indicate the condition of the spark plugs in an engine. While I have shown and described a preferred form of my device, and a modified form, it will be apparent that numerous variations may be made which in no way depart from the spirit of my invention as defined by the appended claims.

I claim as my invention:

1. A pocket-size device for testing the gap setting of spark plugs, which includes: a housing; a plurality of spark gaps of various fixed gap widths in said housing, so adjusted that spark plugs with unknown gap widths may be compared to a properly adjusted standard spark plug, said fixed gaps having one connection common to all of them; an indicator lamp in series with said common connection; and means whereby any one of said gaps, in series with said indicator lamp, may be connected in parallel with said spark plug of unknown gap width.

2. A device as described in claim 1 in which said means consists of a grounding point extending from said housing, and an individual contact rod associated with each of said gaps projecting from said housing.

3. A pocket-sized device for testing the gap setting of spark plugs which includes: a housing; a plurality of spark gaps of various fixed gap widths in said housing, so adjusted that spark plugs with unknown gap widths may be compared to a properly adjusted standard spark plug, said fixed gaps having one connection common to all of them; and means whereby any one of said gaps may be connected in parallel with said spark plug of unknown gap width, said means consisting of a grounding point extending from said housing, and an individual contact rod associated with each of said gaps projecting from said housing.

4. A pocket-sized device for checking the gap setting of spark plugs which includes: a tube-like housing; a plurality of spark gaps of fixed gap setting within said housing, said gaps being adjusted so that spark plugs of unknown gap characteristics may be compared to a properly adjusted standard spark plug; an indicator lamp in one end of said housing; a grounding point extending from the other end of said housing; an individual contact rod associated with each of said gaps and projecting from said housing; and a circuit connecting each of said contact rods to one electrode of its associated fixed spark gap, connecting each of the other electrodes of said fixed spark gaps to a common side of said indicator lamp, and connecting the other side of said indicator lamp to said grounding point.

5. A pocket-sized device for checking the gap setting of spark plugs which includes: a housing having apertures therein; a plurality of spark gaps of fixed gap setting within said housing, each disposed in line with an aperture in said housing and encased in a transparent envelope, said gaps being adjusted so that spark plugs of unknown gap characteristics may be compared to a properly adjusted standard spark plug; an indicator lamp in one end of said housing; a grounding point extending from the other end of said housing; an individual contact rod associated with each of said gaps and projecting from said housing; and a circuit connecting each of said contact rods to one electrode of its associated fixed spark gap, connecting each of the other electrodes of said fixed spark gaps to a common point, connecting said common point to one side of said indicator lamp, and connecting the other side of said indicator lamp to said grounding point.

6. A pocket-sized device for checking the gap setting of spark plugs which includes: a tube-like housing; a spark gap of fixed gap setting within said housing, said gap being adjusted so that spark plugs of unknown gap characteristics may be compared to a properly adjusted standard spark plug; an indicator lamp in one end of said housing; a grounding point extending from the other end of said housing; a contact rod projecting from said housing; and a circuit connecting said contact rod to one electrode of said spark gap, connecting the other electrode of said spark gap to one side of said indicator lamp, and connecting the other side of said indicator lamp to said grounding point.

7. A pocket-sized device for checking the gap setting of spark plugs which includes: a housing having an aperture therein; a spark gap of fixed gap setting within said housing disposed in line with said aperture in said housing and encased in a transparent envelope, said gap being adjusted so that spark plugs of unkown gap characteristics may be compared to a properly adjusted standard plug; an indicator lamp in one end of said housing; a grounding point extending from the other end of said housing; a contact rod projecting from said housing; and a circuit connecting said contact rod to one electrode of said spark gap, connecting the other electrode of said spark gap to one side of said indicator lamp, and connecting the other side of said indicator lamp to said grounding point.

MANDELL W. SAFHOLM.